(12) United States Patent  (10) Patent No.: US 7,656,766 B2
Park et al.  (45) Date of Patent: Feb. 2, 2010

(54) SERVO-CONTROLLING METHOD OF AN OPTICAL DISK APPARATUS

(75) Inventors: Kyung Chan Park, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/507,899

(22) PCT Filed: Mar. 20, 2003

(86) PCT No.: PCT/KR03/00543

§ 371 (c)(1),
(2), (4) Date: May 6, 2005

(87) PCT Pub. No.: WO03/079345

PCT Pub. Date: Sep. 25, 2003

(65) Prior Publication Data

US 2005/0226127 A1    Oct. 13, 2005

(30) Foreign Application Priority Data

Mar. 20, 2002    (KR)    .............. 10-2002-0015164

(51) Int. Cl.
G11B 7/00    (2006.01)
(52) U.S. Cl. .................................. 369/53.28
(58) Field of Classification Search .............. None
See application file for complete search history.

(56) References Cited

U.S. PATENT DOCUMENTS 5,883,873 A * 3/1999 Morita .............. 369/112.26
5,901,125 A * 5/1999 Doi .................. 369/53.22
5,923,633 A * 7/1999 Ando ................ 369/112.01
5,986,985 A   11/1999 Kawamura et al.
6,246,647 B1 * 6/2001 Tsutsui et al. ......... 369/44.29
6,285,635 B1 * 9/2001 Watanabe et al. ...... 369/44.27
2002/0012303 A1 * 1/2002 Furuichi et al. ....... 369/53.22
2002/0027843 A1 * 3/2002 Kim et al. ............ 369/44.35
2003/0039189 A1   2/2003 Yang et al.

FOREIGN PATENT DOCUMENTS

| EP | 0 790 604 A | 8/1997 |
|---|---|---|
| EP | 0856839 | 8/1998 |
| EP | 0 903 735 A | 3/1999 |
| JP | 09293322 | 11/1997 |
| JP | 11-120587 A | 4/1999 |
| KR | 1999-015963 A | 3/1999 |
| KR | 100254604 B1 | 2/2000 |
| KR | 2000-0047505 A | 7/2000 |

* cited by examiner

*Primary Examiner*—Joseph Feild
*Assistant Examiner*—Christopher R Lamb
(74) *Attorney, Agent, or Firm*—Birch, Stewart, Kolasch & Birch, LLP

(57) ABSTRACT

The present invention relates to a servo-controlling method of an optical disk apparatus. In the present invention, an order on which servo-control manner is sequentially applied is determined in advance based on various depth to respective recording layers of a CD, a DVD, and a high-density DVD, and when a disk is placed a servo-control manner is sequentially selected in the determined order. Therefore, a collusion between a disk and an optical pickup can be prevented for any type of disk.

25 Claims, 4 Drawing Sheets

*In Case of CD Placement*    BACKGROUND ART

SERVO-CONTROLLING METHOD OF AN OPTICAL DISK APPARATUS

1. TECHNICAL FIELD

The present invention relates to a method for controlling a servo operation of an optical disk apparatus depending upon various kinds of optical disks, such as a CD (compact disk), a DVD (digital versatile disk), and a HD-DVD (high-density digital versatile disk).

2. BACKGROUND ART

Figure 1:
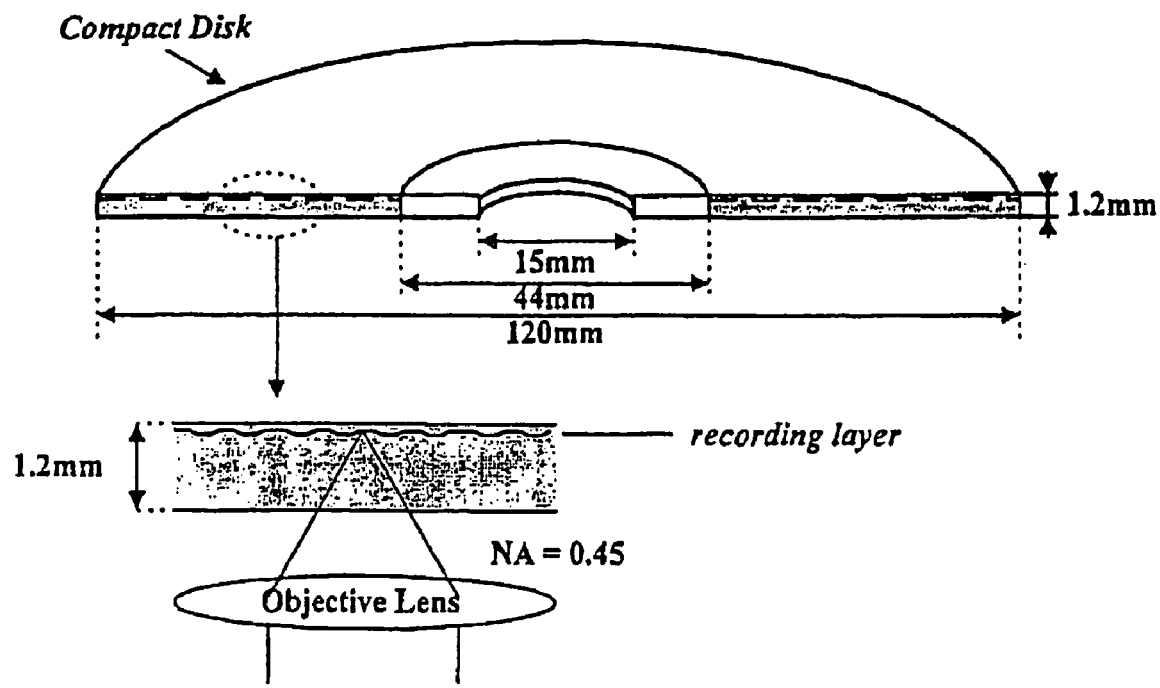

As shown in FIG. 1, a general CD is formed with a thickness of 1.2 mm and a diameter of 120 mm. The CD has a center hole of 15 mm in diameter, and a clamped region of 44 mm in diameter and formed around the center hole. The clamped region is fixed to a turntable of an optical disk apparatus by means of a clamper.

When the CD is properly placed on the optical disk apparatus, a recording layer, on which data are recorded in a pit pattern, is spaced approximately 1.2 mm from the surface of the CD opposite to an object lens of an optical pickup of the optical disk apparatus. The object lens of the optical pickup for the CD has a relatively small numeral aperture (NA). For example, the lens has an NA of 0.4-5.

Figure 2:
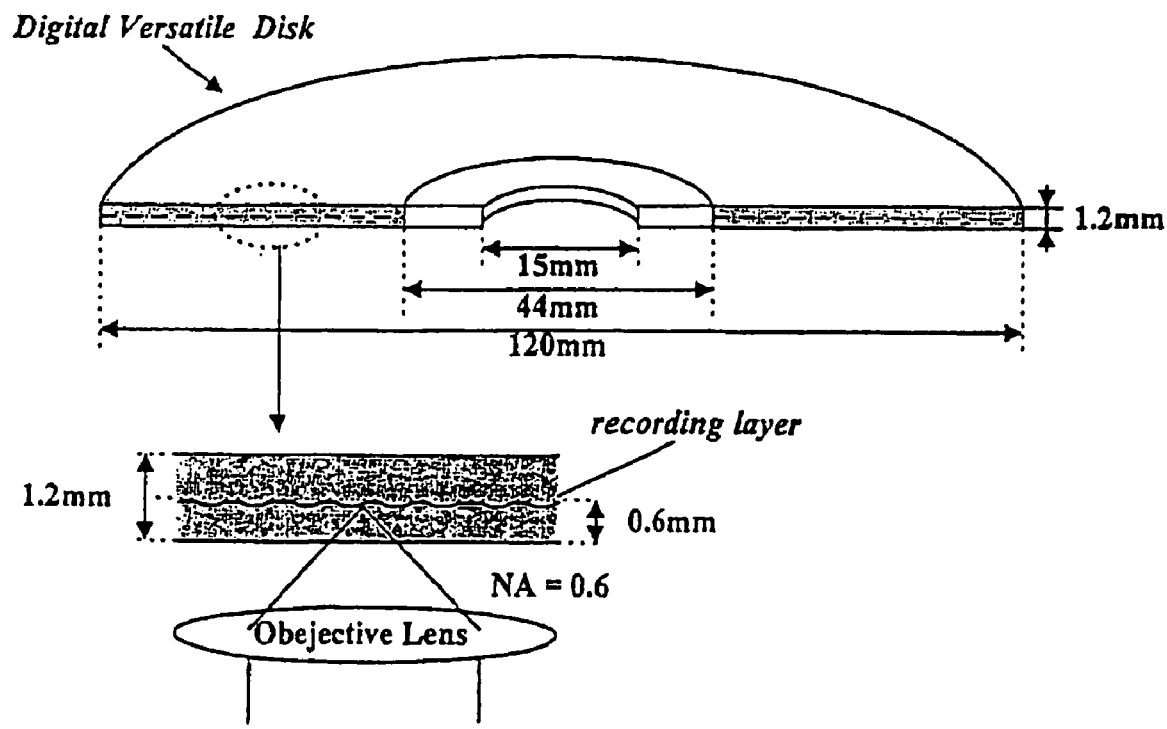

As shown in FIG. 2, a general DVD is formed with a thickness of 1.2 mm and a diameter of 120 mm. The DVD has a center hole of 15 mm in diameter, and a clamped region of 44 mm in diameter and formed around the center hole. The clamped region is fixed to a turntable of an optical disk apparatus by means of a clamper.

When the DVD is properly placed on the optical disk apparatus, a recording layer, on which data are recorded in a pit pattern, is at a distance of approximately 0.6 mm from the surface of the DVD opposite to an object lens of an optical pickup of the optical disk apparatus. The object lens of the optical pickup for the DVD has a relatively large numeral aperture (NA). For example, the lens has an NA of 0.6.

Figure 3:
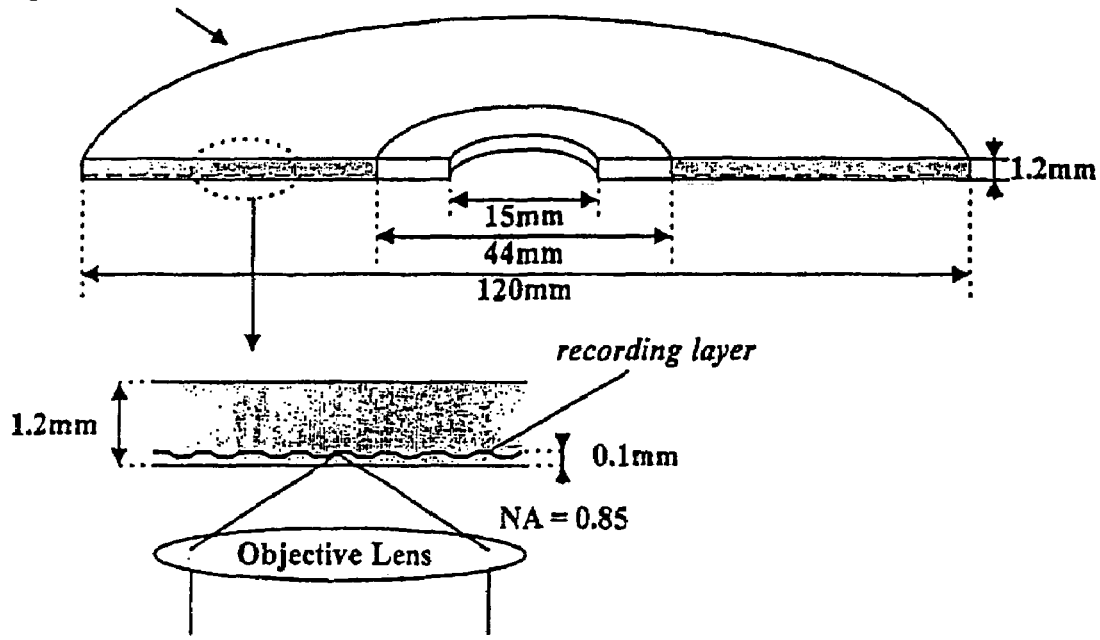

As shown in FIG. 3, a newly commercialized HD-DVD is formed with a thickness of 1.2 mm and a diameter of 120 mm. The HD-DVD has a center hole of 15 mm in diameter, and a clamped region of 44 mm in diameter formed around the center hole. The clamped region is fixed to a turntable of an optical disk apparatus by means of a clamper. When the HD-DVD is properly placed on the optical disk apparatus, a recording layer, on which data are recorded in a pit pattern, is spaced approximately 0.1 mm from the surface of the HD-DVD opposite to an object lens of an optical pickup of the optical disk apparatus.

The object lens of the optical pickup for the HD-DVD has the largest numeral aperture (NA). For example, the lens has an NA of 0.85. The optical pickup for the HD-DVD uses a laser beam having a short wavelength to reproduce data recorded in high density or record data in high density, as compared to the optical pickup for the CD or the DVD.

The object lens of the optical pickup for the HD-DVD is closer to the recording layer of the HD-DVD than that for the CD or the DVD. Furthermore, the object lens of the optical pickup for the HD-DVD has the largest numeral aperture, and the optical pickup for the HD-DVD uses the laser beam having a shorter wavelength than that for the CD or the DVD. Consequently, an increased amount of light can be focused on the recording layer formed in the pit pattern using a small beam spot, and the light transmittance distance of the laser beam having the short wavelength can be shortened.

Figure 4:
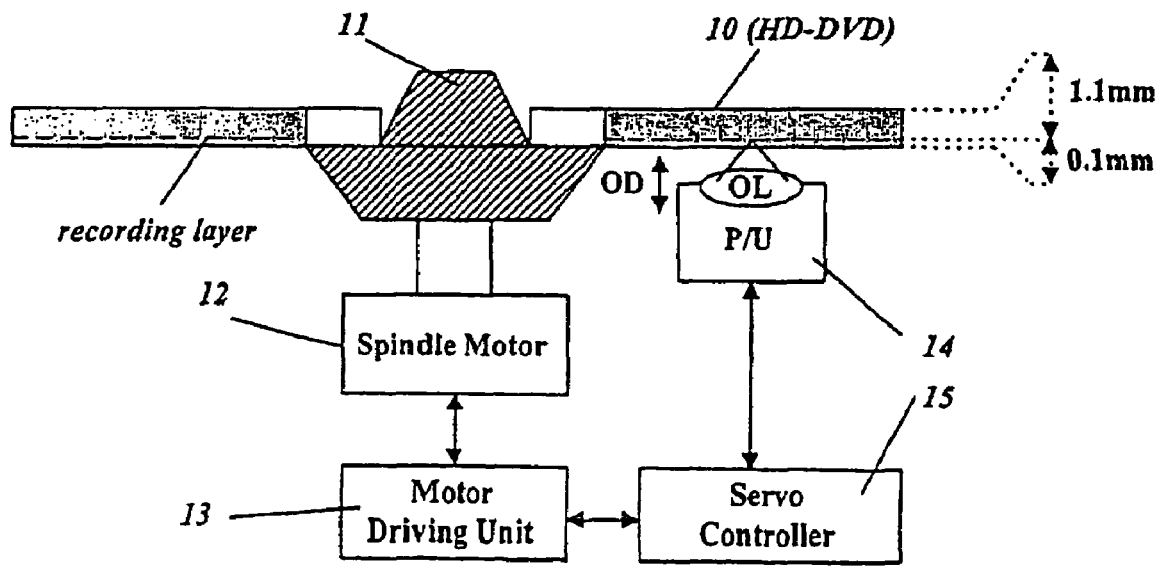

When a HD-DVD 10 is properly placed on a turntable 11 of the optical disk apparatus, as shown in FIG. 4, the HD-DVD 10 is rotated at high speed by a servo operation of a spindle motor 12, a motor driving unit 13, and a servo controller 15. While the HD-DVD 10 is rotated, the object lens OL of an optical pickup 14 of the optical disk apparatus focus on the HD-DVD 10 on the basis of a focusing servo operation by which the object lens OL of the optical pickup 14 is vertically moved within the range of an operating distance OD so that reading high density data recorded in the pit pattern or recording high density data in the pit pattern is normally carried out.

Figure 5:
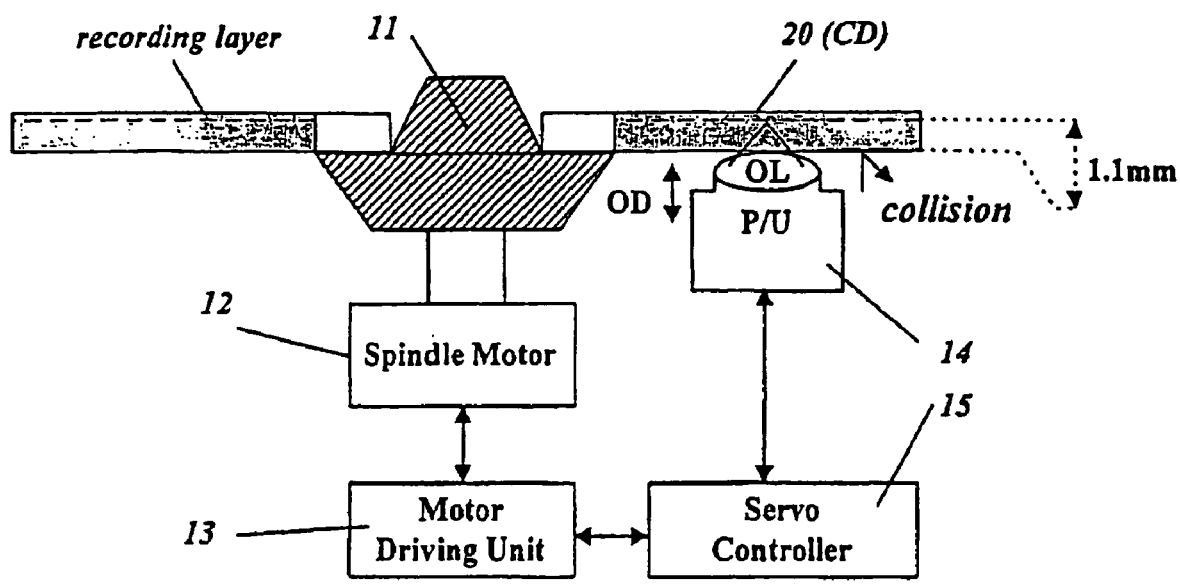

When the HD-DVD 10 is placed upside down on the turntable 11 of the optical disk apparatus, or one of other different kinds of optical disks is placed on the turntable 11 of the optical disk apparatus, for example, when a general CD 20 is placed on the turntable 11 of the optical disk apparatus, as shown in FIG. 5, the CD 20 is also rotated at high speed by a servo operation of the spindle motor 12, the motor driving unit 13, and the servo controller 15. In this case, the recording layer of the CD placed on the turntable 11 of the optical disk apparatus is at a distance of 1.1 mm more from the surface of the CD opposite to the object lens OL of the optical pickup 14 of the optical disk apparatus, as compared to the recording layer of the HD-DVD.

Under the aforesaid condition, the object lens OL of the optical pickup 14 of the optical disk apparatus cannot focus on the CD 20 by a normal focusing operation for moving vertically the object lens OL. For this reason, the object lens OL of the optical pickup 14 of the optical disk apparatus is upwardly moved toward the recording layer of the CD 20 until it moves the maximum operating distance OD_Max under the control of the servo controller 15 for controlling the focusing operation. Consequently, the object lens OL of the optical pickup 14 of the optical disk apparatus comes into collision with the CD 20, which may cause the CD 20 or the object lens OL of the optical pickup 14 to be damaged, or otherwise cause the servo operation to have fatal errors.

3. DISCLOSURE OF INVENTION

Therefore, the present invention has been made in view of the above problems, and it is an object of the present invention to provide a servo-controlling method of an optical disk apparatus that is capable of predetermining the order of servo operations of the optical disk apparatus based on various kinds of optical disks, such as a CD, a DVD, and a HD-DVD, which have different light transmittance depths from the surfaces of the optical disks opposite to an object lens of an optical pickup of the optical disk apparatus when each of the optical disks is placed on a turntable of the optical disk apparatus to recording layers of the optical disks, and sequentially performing the servo operations according to the predetermined order.

In accordance with the present invention, the above and other objects can be accomplished by the provision of a servo-controlling method of an optical disk apparatus, comprising: a first step of determining the order of focusing servo operations of the optical disk apparatus based on various kinds of optical disks having different light transmittance depths from the surfaces of the optical disks each opposite to an object lens of an optical pickup of the optical disk apparatus when each of the optical disks is placed on a turntable of the optical disk apparatus to recording layers of the optical disks; a second step of sequentially performing the focusing servo operations on the optical disk properly placed in the optical disk apparatus according to the predetermined order; and a third step of performing a corresponding tracking servo operation on the optical disk when a normal focusing is achieved on the optical disk in the course of performing the sequential focusing servo operations.

In the servo-controlling method with the above-stated characteristics according to the present invention, collision between the optical disk and the optical pickup of the optical disk apparatus is prevented, and thus the optical disk or the optical disk apparatus is not damaged. Furthermore, fatal errors in the servo operations are effectively prevented.

4. BRIEF DESCRIPTION OF DRAWINGS

Figure 6:
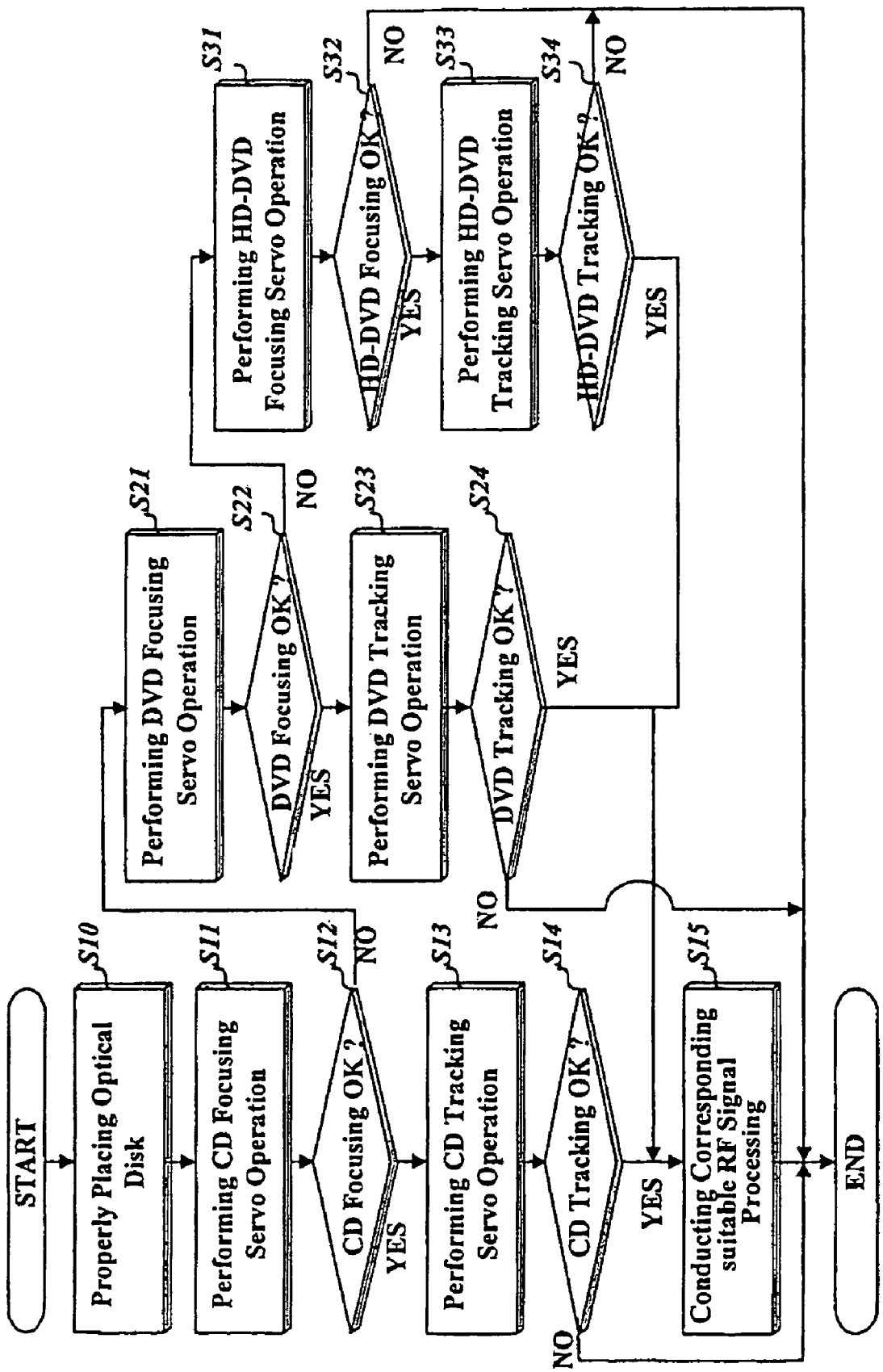

FIG. 1 shows the structure of a general CD;
FIG. 2 shows the structure of a general DVD;
FIG. 3 shows the structure of a general HD-DVD;
FIG. 4 shows a general HD-DVD properly placed in an optical disk apparatus;
FIG. 5 shows a general CD properly placed in an optical disk apparatus; and
FIG. 6 is a flow chart showing several steps of controlling servo operations of an optical disk apparatus according to the present invention.

5. MODES FOR CARRYING OUT THE INVENTION

Now, a servo-controlling method of an optical disk apparatus according to a preferred embodiment of the present invention will be described in detail with reference to the accompanying drawings.

As previously mentioned with reference to FIGS. 4 and 5, the optical disk apparatus, to which the servo-controlling method of the present invention is applied, basically comprises the turntable 11 on which the optical disk is placed, the spindle motor 12 for rotating the optical disk placed on the turntable 11 at high speed, the motor driving unit 13 for driving the spindle motor 12, the optical pickup 14 for reading signals recorded on the optical disk or recording signals on the optical disk, and the servo controller 15 for controlling the focusing servo operation of moving the object lens OL of the optical pickup 14 vertically relative to the recording layer of the optical disk and the tracking servo operation of moving the object lens OL of the optical pickup 14 horizontally along the recording layer of the optical disk.

The servo controller 15 predetermines the order of focusing servo operations of the optical disk apparatus based on various kinds of optical disks having different light transmittance depths from the surfaces of the optical disks opposite to the object lens of the optical pickup of the optical disk apparatus when each of the optical disks is placed on the turntable of the optical disk apparatus to recording layers of the optical disks, for example, the CD having a light transmission depth of 1.2 mm, the DVD having a light transmission depth of 0.6 mm, and the HD-DVD having a light transmission depth of 0.1 mm, as previously mentioned with reference to FIGS. 1 to 3. In this embodiment, the order of the focusing servo operations of the optical disk apparatus is determined in such a manner that a first focusing servo operation is performed on the CD, a second focusing servo operation is performed on the DVD, and a third focusing servo operation is performed on the HD-DVD.

Accordingly, when one of various kinds of the optical disks is properly placed in the optical disk apparatus, the corresponding focusing servo operation is sequentially performed in the order of the CD, the DVD, and the HD-DVD until the normal focusing is achieved on the optical disk placed in the optical disk apparatus.

In case that the normal focusing is achieved on the optical disk, the corresponding tracking servo operation is subsequently carried out to read data recorded on the optical disk or record data on the optical disk, which will be described hereinafter in detail.

FIG. 6 is a flow chart showing several steps of controlling servo operations of an optical disk apparatus according to the present invention.

When one of various kinds of the optical disks is properly placed on the turntable 11 of the optical disk apparatus (S10), the servo controller 15 controls the motor driving unit 13 so that the optical disk is rotated at high speed by the spindle motor 12.

The servo controller 15 also controls the focusing servo operation of moving the object lens OL of the optical pickup 14 vertically relative to the recording layer of the optical disk. At this time, the CD focusing servo operation is firstly performed according to the order of focusing servo operations of the optical disk apparatus based on various kinds of the optical disks having different light transmittance depths from the surfaces of the optical disks opposite to the object lens of the optical pickup of the optical disk apparatus when each of the optical disks is placed on the turntable of the optical disk apparatus to recording layers of the optical disks (S11).

Consequently, the object lens OL of the optical pickup of the optical disk apparatus is upwardly moved until it reaches the maximum movable position predetermined for the CD having the light transmittance depth of 1.2 mm.

When the CD focusing is achieved in the course of upward movement of the object lens OL of the optical pickup (S12), the tracking servo operation of moving the object lens OL of the optical-pickup 14 horizontally along the recording layer of the CD is subsequently performed under the control of the servo controller 15 (S13).

When the central part of the track formed on the recording layer of the optical disk is normally tracked by means of the tracking servo operation for the CD, i.e., when the normal tracking is achieved (S14), the current CD focusing and tracking servo operations are continuously performed under the control of the servo controller 15. Consequently, a RF signal outputted from the optical pickup is transmitted to a digital signal processing unit (not shown) of the optical disk apparatus where the signal is processed in a suitable manner (S15).

When the CD focusing is not achieved in the course of upward movement of the object lens OL of the optical pickup (S12), the DVD focusing servo operation is secondly performed-according to the order of focusing servo operations of the optical disk apparatus based on various kinds of the optical disks having different light transmittance depths from the surfaces of the optical disks each opposite to the object lens of the optical pickup of the optical disk apparatus when each of the optical disks is placed on the turntable of the optical disk apparatus to recording layers of the optical disks (S21).

Consequently, the object lens OL of the optical pickup of the optical disk apparatus is upwardly moved until it reaches the maximum movable position predetermined for the DVD having the light transmittance depth of 0.6 mm.

When the DVD focusing is achieved in the course of upward movement of the object lens OL of the optical pickup (S22), the tracking servo operation of moving the object lens OL of the optical pickup 14 horizontally along the recording layer of the DVD is subsequently performed under the control of the servo controller 15 (S23).

When the central part of the track formed on the recording layer of the optical disk is normally tracked by means of the tracking servo operation for the DVD, i.e., when the normal tracking is achieved (S24), the current DVD focusing and tracking servo operations are continuously performed under the control of the servo controller 15. Consequently, a RF signal outputted from the optical pickup is transmitted to the digital signal processing unit of the optical disk apparatus where the signal is processed (S15).

When the DVD focusing is not achieved in the course of upward moving of the object lens OL of the optical pickup (S22), the HD-DVD focusing servo operation is thirdly performed according to the order of focusing servo operations of the optical disk apparatus based on various kinds of the optical disks having different light transmittance depths from the surfaces of the optical disks opposite to the object lens of the optical pickup of the optical disk apparatus when each of the optical disks is placed on the turntable of the optical disk apparatus to recording layers of the optical disks (S31).

Consequently, the object lens OL of the optical pickup of the optical disk apparatus is upwardly moved until it reaches the maximum movable position predetermined for the HD-DVD having the light transmittance depth of 0.1 mm.

When the HD-DVD focusing is achieved in the course of upward moving of the object lens OL of the optical-pickup (S32), the tracking servo operation of moving the object lens OL of the optical pickup 14 horizontally along the recording layer of the HD-DVD is subsequently performed under the control of the servo controller 15 (S33).

When the central part of the track formed on the recording layer of the optical disk is normally tracked by means of the tracking servo operation for the HD-DVD, i.e., when the normal tracking is achieved (S34), the current. HD-DVD focusing and tracking servo operations are continuously performed under the control of the servo controller 15. Consequently, a RF signal outputted from the optical pickup is transmitted to the digital signal processing unit of the optical disk apparatus where the signal is processed (S15).

The aforesaid optical pickup of the optical disk apparatus may comprise a plurality of lasers corresponding to kinds of the optical disks, and a plurality of object lenses having different numeric apertures so that normal focusing and tracking servo operations can be smoothly achieved on various kinds of the optical disks, such as the CD, the DVD, and the HD-DVD, which have different light transmittance depths from the surfaces of the optical disks each opposite to the object lens of the optical pickup of the optical disk apparatus when each of the optical disks is placed on the turntable of the optical disk apparatus to recording layers of the optical disks.

The preferred embodiment of the present invention has been disclosed for illustrative purposes. Therefore, those skilled in the art will appreciate that various modifications, additions and substitutions are possible, without departing from the scope and spirit of the invention as disclosed in the accompanying claims. For example, a servo-controlling method of an optical disk apparatus according to the present invention may be carried out by means of another component for controlling a servo controller, such as a microcomputer for controlling all of the optical disk apparatus.

The invention claimed is:

1. A servo controlling method of an optical disk apparatus, comprising:
    determining the order of focusing servo operations of the optical disk apparatus based on various kinds of optical disks having different light transmittance depths from the surfaces of the optical disks opposite to an object lens of an optical pickup of the optical disk apparatus when each of the optical disks is placed on a turntable of the optical disk apparatus to recording layers of the optical disks;
    sequentially performing the focusing servo operations on the optical disk properly placed in the optical disk apparatus according to the predetermined order by sequentially focusing a lens of an optical pickup on the optical disk and advancing the lens towards the optical disk until a normal focusing is achieved on the optical disk;
    determining if the normal focusing was achieved during one of the focusing servo operations; and
    performing a corresponding tracking servo operation on the optical disk once the normal focusing is achieved on the optical disk in the course of performing the sequential focusing servo operations,
    wherein the various kinds of optical disk includes a CD, a DVD, and a higher-density disk having a higher density than the DVD, the higher-density disk having a light transmittance depth of 0.1 mm regarding a recording layer,
    wherein each focusing servo operation has a different movable distance of the lens of the optical pickup depending upon the predetermined order to prevent the lens of the optical pickup device from colliding with the optical disk, and
    wherein the sequentially performing the focusing servo operations performs the sequential focusing servo operation within the corresponding movable distance according to the predetermined order.

2. The method as set forth in claim 1, wherein the determining the order of focusing servo operations determines the order of the focusing servo operations of the optical disk apparatus so that the focusing servo operations are sequentially performed from the optical disk having large light transmittance depth to the optical disk having small light transmittance depth.

3. The method as set forth in claim 1, wherein the determining the order of focusing servo operations determines the order of the focusing servo operations of the optical disk apparatus so that the focusing servo operations are sequentially performed on the optical disk in the order of the CD, the DVD, and the higher-density disk.

4. The method as set forth in claim 3, wherein the sequentially performing the focusing servo operations sequentially performs the focusing servo operations on the optical disk properly placed in the optical disk apparatus in the order of the CD, the DVD, and the higher-density disk.

5. The method as set forth in claim 4, wherein the performing a corresponding tracking servo operation performs the corresponding CD tracking servo operation when the normal focusing is achieved on the CD in the course of performing the sequential focusing servo operations.

6. The method as set forth in claim 5, wherein the performing a corresponding tracking servo operation performs the focusing servo operation on the DVD when the normal focusing is not achieved on the CD, and then performs the corresponding DVD tracking servo operation when the normal focusing is achieved on the DVD.

7. The method as set forth in claim 6, wherein the performing a corresponding tracking servo operation performs the focusing servo operation on the higher-density disk when the normal focusing is not achieved on the DVD, and then performs the corresponding higher-density disk tracking servo operation when the normal focusing is achieved on the higher-density disk.

8. The method as set forth in claim 1, wherein the sequentially performing the focusing servo operations is sequentially performed until the normal focusing is achieved on the optical disk.

9. A servo controlling method of an optical disk apparatus, comprising:

sequentially performing focusing servo operations on a optical disk placed in the optical disk apparatus based on various kinds of optical disks having different light transmittance depths from the surfaces of the optical disks opposite to an object lens of an optical pickup of the optical disk apparatus when each of the optical disks is placed on a turntable of the optical disk apparatus to recording layers of the optical disks by sequentially focusing a lens of an optical pickup on the optical disk and advancing the lens towards the optical disk until a normal focusing is achieved on the optical disk, the sequentially performing focusing servo operations including sequentially:

performing a first focusing servo operation for the optical disk having a large light transmittance depth by moving the optical pickup within a first movable distance predetermined for the first focusing servo operation;

performing a second focusing servo operation for the optical disk having a small light transmittance depth compared to the optical disk having the large light transmittance depth when the normal focusing is not achieved during the first focusing servo operation by moving the optical pickup within a second movable distance predetermined for the second focusing servo operation; and performing a third focusing servo operation for the optical disk having a smaller light transmittance depth than the optical disk having the small light transmittance depth when the normal focusing is not achieved during the second focusing servo operation by moving the optical pickup within a third movable distance predetermined for the third focusing servo operation;

determining whether the normal focusing was achieved during the first focusing servo operation and performing a first corresponding tracking servo operation on the optical disk when the normal focusing is achieved on the optical disk in the course of performing the first focusing servo operation;

if no normal focusing was achieved during the first focusing servo operation, determining whether normal focusing was achieved during the second focusing servo operation and performing a second corresponding tracking servo operation on the optical disk when the normal focusing is achieved on the optical disk in the course of performing the second focusing servo operation; and if no normal focusing was achieved during the second focusing servo operation, determining whether normal focusing was achieved during the third focusing servo operation and performing a third corresponding tracking servo operation on the optical disk when the normal focusing is achieved on the optical disk in the course of performing the third focusing servo operation, wherein the various kinds of optical disks include a CD, a DVD, and a higher-density disk having a higher density than the DVD, the higher-density disk having a light transmittance depth of 0.1 mm regarding a recording layer, wherein the first, second, and third movable distances of the lens of the optical pickup are differently determined depending upon the predetermined order to prevent the lens of the optical pick device from colliding with the optical disk, and wherein the performing steps perform the corresponding focusing servo operations within the corresponding movable distances according to the predetermined order.

10. The method as set forth in claim 9, wherein the first to third focusing servo operations are sequentially performed on the optical disk in the order of the CD, the DVD, and the higher-density disk.

11. The method as set forth in claim 10, wherein the performing the first tracking servo operation performs a CD tracking servo operation when the normal focusing is achieved on the CD in the course of performing the first focusing servo operation.

12. The method as set forth in claim 11, wherein the performing the second tracking servo operation performs a DVD tracking servo operation when the normal focusing is achieved on the DVD in the course of performing the second focusing servo operation.

13. The method as set forth in claim 12, wherein the performing the third track servo operation performs a higher-density disk tracking servo operation when the normal focusing is achieved on the higher-density disk in the course of performing the third focusing servo operation.

14. An optical disk apparatus comprising:

an optical pickup configured to perform at least one of read signals recorded on an optical disk and record signals on the optical disk, the optical pickup having an optical lens; and a servo controller, the servo controller being configured to:

determine the order of focusing servo operations of the optical disk apparatus based on various kinds of optical disks having different light transmittance depths from the surfaces of the optical disks opposite to an object lens of an optical pickup of the optical disk apparatus when each of the optical disks is inserted into the optical disk apparatus to recording layers of the optical disks;

sequentially perform the focusing servo operations on the optical disk properly placed in the optical disk apparatus according to the predetermined order by sequentially focusing a lens of an optical pickup on the optical disk and advancing the lens towards the optical disk until a normal focusing is achieved on the optical disk;

determine if the normal focusing was achieved during one of the focusing servo operations; and perform a corresponding tracking servo operation on the optical disk once the normal focusing is achieved on the optical disk in the course of performing the sequential focusing servo operations, wherein the various kinds of optical disks include a CD, a DVD, and a high density disk having a higher density than the DVD, the high density disk having a light transmittance depth of 0.1 mm regarding a recording layer, wherein each focusing servo operation having a different movable distance of the lens of the optical pickup depending upon the predetermined order to prevent the lens of the optical pickup device from colliding with the optical disk, and wherein the sequentially performing the focusing servo operations performs the focusing servo operation within the corresponding movable distance according to the predetermined order.

15. The apparatus as set forth in claim 14, wherein the servo controller is configured to determine the order of the focusing servo operations of the optical disk apparatus so that the focusing servo operations are sequentially performed from the optical disk having large light transmittance depth to the optical disk having small light transmittance depth.

16. The apparatus as set forth in claim 14, wherein the servo controller is configured to determine the order of the focusing servo operations of the optical disk apparatus so that the focusing servo operations are sequentially performed on the optical disk in the order of the CD, the DVD, and the higher-density disk.

17. The apparatus as set forth in claim 16, wherein the servo controller is configured to sequentially perform the focusing servo operations on the optical disk properly placed in the optical disk apparatus in the order of the CD, the DVD, and the higher-density disk.

18. The apparatus as set forth in claim 17, wherein the servo controller is configured to perform the corresponding CD tracking servo operation when the normal focusing is achieved on the CD in the course of performing the sequential focusing servo operations.

19. The apparatus as set forth in claim 18, wherein the servo controller is configured to perform the focusing servo operation on the DVD when the normal focusing is not achieved on the CD, and then perform the corresponding DVD tracking servo operation when the normal focusing is achieved on the DVD.

20. The apparatus as set forth in claim 19, wherein the servo controller is configured to perform the focusing servo operation on the higher-density disk when the normal focusing is not achieved on the DVD, and then perform the corresponding higher-density disk tracking servo operation when the normal focusing is achieved on the higher-density disk.

21. An optical disk apparatus comprising:
   an optical pickup configured to perform at least one of read signals recorded on an optical disk and record signals on the optical disk, the optical pickup having an optical lens; and
   a servo controller, the servo controller being configured to:
      sequentially perform focusing servo operations on a optical disk placed in the optical disk apparatus based on various kinds of optical disks having different light transmittance depths from the surfaces of the optical disks opposite to an object lens of an optical pickup of the optical disk apparatus when each of the optical disks is inserted into the optical disk apparatus to recording layers of the optical disks by sequentially focusing a lens of an optical pickup on the optical disk and advancing the lens towards the optical disk until a normal focusing is achieved on the optical disk, the sequentially performed focusing servo operations include sequentially:
      performing a first focusing servo operation for the optical disk having a large light transmittance depth by moving the optical pickup within a first movable distance predetermined for the first focusing servo operation;
      performing a second focusing servo operation for the optical disk having a small light transmittance depth compared to the optical disk having the large light transmittance depth when the normal focusing is not achieved during the first focusing servo operation by moving the optical pickup within a second movable distance predetermined for the second focusing servo operation; and
      performing a third focusing servo operation for the optical disk having a smaller light transmittance depth than the optical disk having the small light transmittance depth when the normal focusing is not achieved during the second focusing servo operation by moving the optical pickup within a third movable distance predetermined for the third focusing servo operation;
      determine whether the normal focusing was achieved during the first focusing servo operation and perform a first corresponding tracking servo operation on the optical disk when the normal focusing is achieved on the optical disk in the course of performing the first focusing servo operation;
      if no normal focusing was achieved during the first focusing servo operation, determine whether normal focusing was achieved during the second focusing servo operation and perform a second corresponding tracking servo operation on the optical disk when the normal focusing is achieved on the optical disk in the course of performing the second focusing servo operation; and
      if no normal focusing was achieved during the second focusing servo operation, determine whether normal focusing was achieved during the third focusing servo operation and perform a third corresponding tracking servo operation on the optical disk when the normal focusing is achieved on the optical disk in the course of performing the third focusing servo operation,
   wherein the various kinds of optical disks include a CD, a DVD, and a higher-density disk having a higher density than the DVD, the higher-density disk having a light transmittance depth of 0.1 mm regarding a recording layer,
   wherein the first, second, and third movable distances of the lens of the optical pickup are differently determined depending upon the predetermined order to prevent the lens of the optical pick device from colliding with the optical disk, and
   wherein the performing steps perform the corresponding focusing servo operations within the corresponding movable distances according to the predetermined order.

22. The apparatus as set forth in claim 21, wherein the servo controller is configured such that the first to third focusing servo operations are sequentially performed on the optical disk in the order of the CD, the DVD, and the higher-density disk.

23. The apparatus as set forth in claim 22, wherein the servo controller is configured to perform a CD tracking servo operation when the normal focusing is achieved on the CD in the course of performing the first focusing servo operation.

24. The apparatus as set forth in claim 23, wherein the servo controller is configured to perform a DVD tracking servo operation when the normal focusing is achieved on the DVD in the course of performing the second focusing servo operation.

25. The apparatus as set forth in claim 24, wherein the servo controller is configured to perform a higher-density disk tracking servo operation when the normal focusing is achieved on the higher-density disk in the course of performing the third focusing servo operation.

* * * * *